United States Patent Office.

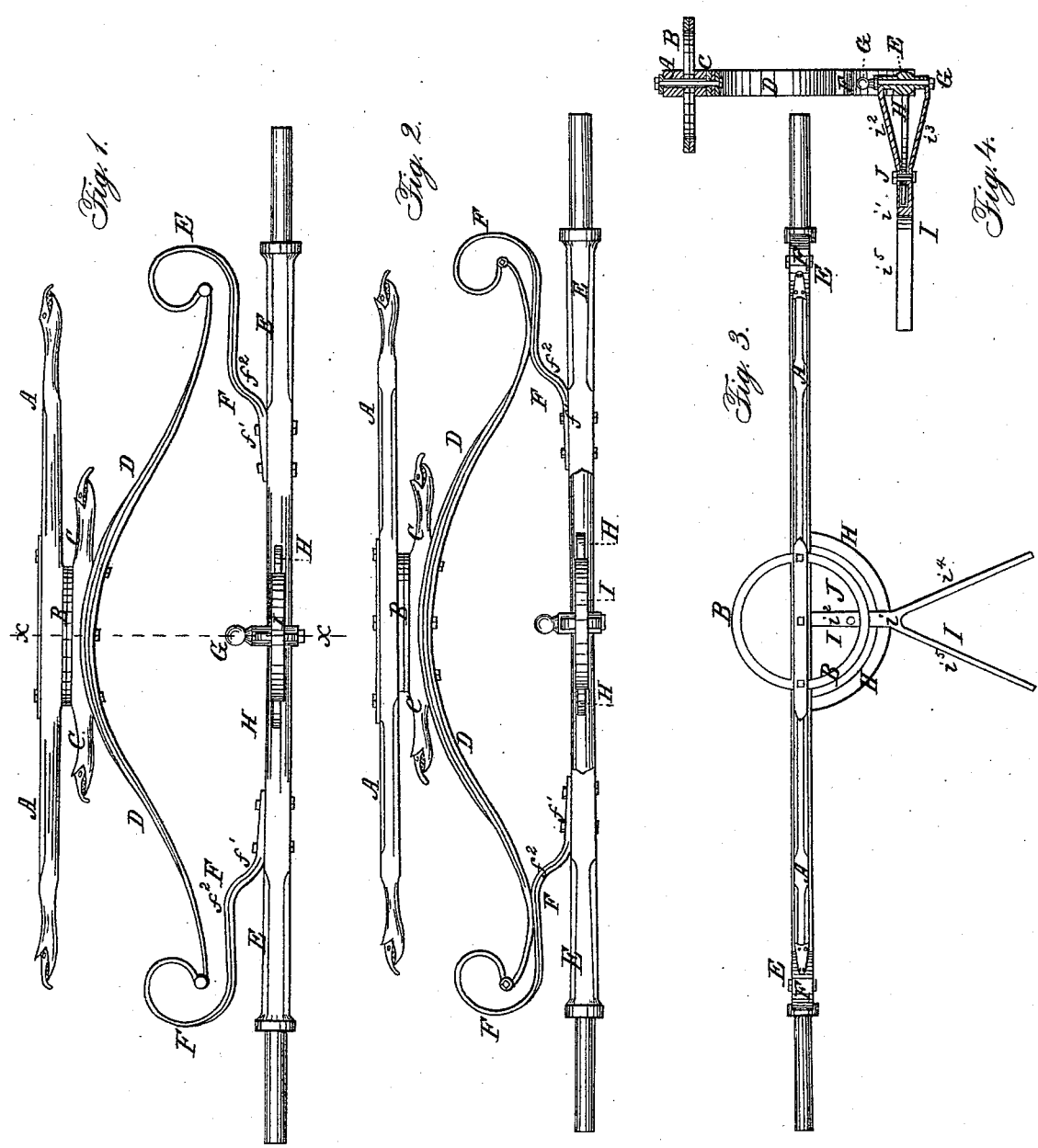

THOMAS DE WITT, OF DETROIT, MICHIGAN.

Letters Patent No. 64,501, dated May 7, 1867.

IMPROVEMENT IN CARRIAGE-SPRING AND COUPLING.

*The Schedule referred to in these Letters Patent and making part of the same.*

TO ALL WHOM IT MAY CONCERN:

Be it known that I, THOMAS DE WITT, of Detroit, in the county of Wayne, and State of Michigan, have invented a new and useful Improvement in Spring-Jack and Coupling for Wheel Carriages; and I do hereby declare that the following is a full, clear, and exact description thereof, which will enable others skilled in the art to make and use the same, reference being had to the accompanying drawings, forming part of this specification, in which—

Figure 1 is a side view of an axle and elliptic spring, with my improvements attached.

Figure 2 is the same view as fig. 1, showing the position of the parts when supporting a heavy weight.

Figure 3 is a top view of the same.

Figure 4 is a vertical section of the same, taken through the line $x\ x$, fig. 1.

My invention has for its object to furnish an improvement in the construction of the jack or supporting springs which connect the half-elliptic springs of a carriage to the axle, said jack-springs being so constructed as to divide the pressure of the weight, part of said pressure acting in a horizontal and part in a vertical direction; and also to furnish a simple, cheap, and durable coupling for connecting the front and rear axles of a carriage. And it consists, first, in the jack or supporting springs, when constructed with a shoulder or double curve, as hereinafter more fully described, in combination with the axle and with the half-elliptic spring, for the purpose of furnishing a support to the body of the said elliptic spring, when a great weight has to be supported thereby; second, in the form and arrangement of the clevis or branch-coupling, by which the front and rear axles of the carriage are connected.

A is the spring-bar, to which the body of the carriage is attached. B is the fifth-wheel. C is the head-block. D is the half-elliptic spring; and E is the front axle of the carriage. About the construction of all these parts there is nothing new. F are the jack and connecting-springs, which sustain the ends of the half-elliptic spring and connect it to the axle. The lower ends of the springs F are bolted or otherwise firmly secured to the axle E at a point about equidistant from the king-bolt G and the parts of the axle upon which the hubs work. From the point of support $f^1$ the springs F rise with a short curve, $f^2$, so as to form a shoulder, as shown in figs. 1 and 2. From this point they sweep around with a graceful curve until they meet the ends of the half-elliptic spring D, to which they are pivoted in the ordinary manner. By giving this form to the springs F, the pressure applied to the spring D is distributed, part of said pressure acting in a horizontal and part in a vertical direction, thereby giving an easy vibratory motion, free from any side swing, to the carriage. The ends of the spring D and of the springs F may be made light, so that the carriage may ride easy when lightly loaded. But when the carriage is more heavily loaded, the body of the spring D comes in contact with the shoulders or short curves $f^2$, and the weight is then supported by the stronger and heavier parts of the springs, as shown in fig. 2, thus rendering it nearly impossible to break the springs from overloading the carriage. The springs D and F may be made with one, two, or more leaves, according to the character of the carriage to which they may be applied. To the rear side of the axle E are attached the ends of the half circle H, to prevent the axle from turning or rolling, and thus breaking the springs F or D, or the king-bolt G. I is the coupling, which is divided at the point $i^1$ into branches $i^2$, $i^3$, $i^4$, and $i^5$, as shown in figs. 3 and 4. The branches $i^2$ and $i^3$ pass forward nearly parallel, one on each side of the half circle H, until they have passed that circle, at which point they are connected by a bolt, J, as seen in figs. 3 and 4, forming a slot or channel for the half circle to work in. From the bolt J they separate, the one branch $i^2$ passing above, and the other branch $i^3$ below, the axle E, to which they are secured by the king-bolt G, which passes through their ends and through the axle E, as shown in fig. 4. The other or horizontal branches $i^4$ and $i^5$ of the coupling I gradually separate from each other, as shown in fig. 3, and pass back to the rear axle of the carriage, to which they are connected, one near each end of said axle, in the ordinary manner, thus forming a simple, cheap, and durable coupling, and one not liable to break or get out of order.

Having thus described my invention, what I claim as new, and desire to secure by Letters Patent, is—

1. The spring F, having shoulder $f^2$, in combination with the spring D, and immediately secured to the axle E, substantially as described, for the purpose specified.

2. The coupling I, herein described, the same consisting of the branches $i^2$, $i^3$, $i^4$, $i^5$, in combination with the half circle H, constructed and arranged substantially as and for the purpose specified.

THOMAS DE WITT.

Witnesses:
JOHN WARD,
L. M. WHITING.